(12) United States Patent
Mukherjee et al.

(10) Patent No.: US 10,419,185 B2
(45) Date of Patent: Sep. 17, 2019

(54) SYSTEM AND METHOD FOR LISTEN BEFORE TALK-BASED RANDOM ACCESS WITH PARTIAL SUBFRAMES

(71) Applicant: Telefonaktiebolaget LM Ericsson (publ), Stockholm (SE)

(72) Inventors: Amitav Mukherjee, Fremont, CA (US); Henrik Sahlin, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/770,104

(22) PCT Filed: Nov. 4, 2016

(86) PCT No.: PCT/SE2016/051084
§ 371 (c)(1),
(2) Date: Apr. 20, 2018

(87) PCT Pub. No.: WO2017/078602
PCT Pub. Date: May 11, 2017

(65) Prior Publication Data
US 2018/0316474 A1 Nov. 1, 2018

Related U.S. Application Data

(60) Provisional application No. 62/252,071, filed on Nov. 6, 2015.

(51) Int. Cl.
*H04L 5/00* (2006.01)
*H04W 74/00* (2009.01)
(Continued)

(52) U.S. Cl.
CPC ......... *H04L 5/0053* (2013.01); *H04W 72/042* (2013.01); *H04W 72/14* (2013.01);
(Continued)

(58) Field of Classification Search
None
See application file for complete search history.

(56) References Cited

U.S. PATENT DOCUMENTS

2013/0294361 A1 11/2013 Chen et al.
2014/0307677 A1* 10/2014 Yamada ............ H04W 56/0005
370/329

(Continued)

OTHER PUBLICATIONS

3GPP TS 36.211 v12.7.0; Technical Specification; 3rd Generation Partnership Project; Technical Specification Group Radio Access Network; Evolved Universal Terrestrial Radio Access (E-UTRA); Physical channels and modulation (Release 12)—Sep. 2015.

(Continued)

*Primary Examiner* — Brian S Roberts

(57) ABSTRACT

Systems and methods are provided for listen before talk-based random access with partial subframes. For example, a method 500 by a network node 115 is provided for transmitting a random access (RA) response. The method includes forming, by the network node 115, a first signal 300, 400 for transmission to a wireless device 110. Forming the first signal may include placing a response message 302, 406 within a first partial subframe of the first signal. The first partial subframe may include a control data portion of a Physical Downlink Control Channel (PDCCH) message 304, 408. The method may further include transmitting, by the network node 115, the first signal to the wireless device 110.

6 Claims, 20 Drawing Sheets

(51) Int. Cl.
H04W 74/08 (2009.01)
H04W 72/04 (2009.01)
H04W 72/14 (2009.01)

(52) U.S. Cl.
CPC ..... *H04W 74/006* (2013.01); *H04W 74/0816* (2013.01); *H04W 74/004* (2013.01)

(56) References Cited

U.S. PATENT DOCUMENTS

| | | | | |
|---|---|---|---|---|
| 2015/0257173 | A1* | 9/2015 | You | H04L 1/1864 370/330 |
| 2016/0100374 | A1* | 4/2016 | Choi | H04W 56/0015 370/331 |
| 2017/0048047 | A1* | 2/2017 | Kadous | H04L 1/1635 |

OTHER PUBLICATIONS

3GPP TS 36.213 v12.7.0; Technical Specification; 3rd Generation Partnership Project; Technical Specification Group radio Access Network; Evolved Universal Terrestrial Radio Access (E-UTRA); Physical layer procedures (Release 12)—Sep. 2015.

3GPP TS 36.331 v12.7.0; Technical Specification; 3rd Generation Partnership Project; Technical Specification Group Radio Access Network; Evolved Universal Terrestrial Radio Access (E-UTRA); Radio Resource Control (RRC); Protocol specification (Release 12)—Sep. 2015.

3GPP TSG RAN WG1 #80; Athens, Greece; Source: Samsung; Title: Discussion on UL transmission for LAA (R1-150368)—Feb. 9-13, 2015.

3GPP TSG-RAN WG1 Meeting #82bis; Malmo, Sweden; Source: InterDigital Communications; Title: On LAA scheduling (R1-155529)—Oct. 5-9, 2015

3GPP TSG-RAN WG1 #84bis; Busan, Korea; Source: Ericsson; Title: PRACH Design for Enhanced LAA (R1-163146)—Apr. 11-15, 2016.

PCT International Search Report for International application No. PCT/SE2016/051084—dated Feb. 2, 2017.

PCT Written Opinion of the International Searching Authority for International application No. PCT/SE2016/051084—dated Feb. 2, 2017.

* cited by examiner ations. Finally, the RA response may assign the uplink resources to be used by the UE for the subsequent transmission in the third step.

SYSTEM AND METHOD FOR LISTEN BEFORE TALK-BASED RANDOM ACCESS WITH PARTIAL SUBFRAMES

PRIORITY

This nonprovisional application is a U.S. National Stage Filing under 35 U.S.C. § 371 of International Patent Application Serial No, PCT/SE2016/01084 filed Nov. 4, 2016, and entitled "SYSTEM AND METHOD FOR LISTEN BEFORE TALK-BASED RANDOM ACCESS WITH PARTIAL SUBFRAMES" which claims priority to U.S. Provisional Patent Application No, 62/252,071 tiled Nov. 6, 2015, both of which are hereby incorporated by reference in their entirety.

TECHNICAL FIELD

Particular embodiments relate generally to wireless communications and more particularly to system and method for listen before talk-based random access with partial subframes.

BACKGROUND

The upcoming standalone LTE in Unlicensed Spectrum (LTE-U) forum and future 3GPP Rel-14 work item on Uplink Licensed-Assisted Access (LAA) intend to allow LTE UEs to transmit on the uplink in the unlicensed 5 GHz or license-shared 3.5 GHz radio spectrum. For the case of standalone LTE-U, the initial random access and subsequent uplink (UL) transmissions take place entirely on the unlicensed spectrum. Regulatory requirements may not permit transmissions in the unlicensed spectrum without prior channel sensing. Since the unlicensed spectrum must be shared with other radios of similar or dissimilar wireless technologies, a so-called listen-before-talk (LBT) procedure should be performed. LBT involves sensing the medium for a pre-defined minimum amount of time and backing off if the channel is busy. Therefore, the initial random access (RA) procedure for standalone LTE-U should involve as few transmissions as possible and also have low latency, such that the number of LBT operations can be minimized and the RA procedure can then be completed as quickly as possible.

Today, the unlicensed 5 GHz spectrum is mainly used by equipment implementing the IEEE 802.11 Wireless Local Area Network (WLAN) standard, also known under its marketing brand as "Wi-Fi."

LTE uses orthogonal frequency-division multiplexing (OFDM) in the downlink and Discrete Fourier Transform (DFT) spread (also referred to as single-carrier FDMA) in the uplink. FIG. 1 illustrates a basic LTE downlink physical resource as a time-frequency grid where each resource element corresponds to one OFDM subcarrier during one OFDM symbol interval. The uplink subframe has the same subcarrier spacing as the downlink and the same number of single carrier-frequency division multiple access (SC-FDMA) symbols in the time domain as OFDM symbols in the downlink.

FIG. 2 illustrates an example LTE time-domain structure. As illustrated, LTE downlink transmissions are organized into radio frames of 10 ms in the time domain, and each radio frame consists of ten equally-sized subframes of length Tsubframe=1 ms. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

In LTE, the Physical Random Access Channel (PRACH) is used for initial network access, but the PRACH cannot carry any user data, which is exclusively sent on the Physical Uplink Shared Channel (PUSCH). Instead, the LTE PRACH is used to achieve uplink time synchronization for a user equipment (UE) which either has not yet acquired, or has lost, its uplink synchronization.

FIG. 3 illustrates an RA preamble format. Specifically, FIG. 3 illustrates the structure of a RA preamble sent on the PRACH where a cyclic prefix (CP) is followed by a preamble sequence derived from a Zadoff-Chu root sequence. In the time domain, the PRACH may span between one to three subframes for frequency-division duplexing (FDD) LTE. Any unused portion of the last PRACH subframe is utilized as a guard period. In the frequency domain, the PRACH spans six resource blocks (1.08 MHz).

Downlink and uplink LTE transmissions are dynamically scheduled. For example, in each subframe, the base station transmits control information on the DL about which terminals can transmit in upcoming UL subframes, and in which resource blocks the data is to be transmitted. This control signaling is typically transmitted in the first 1, 2, 3 or 4 OFDM symbols in each subframe. The downlink subframe also contains common reference symbols, which are known to the receiver and used for coherent demodulation of the control information.

FIG. 4 illustrates a typical downlink subframe. As depicted, the downlink subframe has three OFDM symbols as control. The reference symbols are the cell specific reference symbols (CRS) and are used to support multiple functions including fine time and frequency synchronization and channel estimation for certain transmission modes.

According to Rel-8 to Rel-10, only the Physical Downlink Control Channel (PDCCH) is available for carrying RA responses from the eNodeB (eNB) when responding to initial RA transmissions on the UL. However, from LTE Rel-11 and thereafter, resource assignments and RA responses can also be scheduled on the enhanced Physical Downlink Control Channel (EPDCCH).

A typical LTE contention-based RA procedure for initial network access on licensed carriers consists of four steps. In a first step, the UE, which may include a user equipment or any other wireless device, selects and transmits one out of 64 available PRACH sequences. The transmission location may be based on the PRACH configuration broadcast in the cell system information. This preamble transmission on the uplink (UL) may be known as message1 or msg1.

In a second step, the RA response is sent by the eNB on the downlink (DL). This message may be known as message2 or msg2. Specifically, it may be sent on the PDSCH and indicated using the PDCCH, and addressed with an ID. The Random Access Radio Network Temporary Identifier (RA-RNTI) may identify the time-frequency slot in which the preamble was detected. The RA response conveys the identity of the detected preamble, a timing alignment instruction to synchronize subsequent uplink transmissions from the UE, an initial uplink resource grant for a subsequent transmission, and an assignment of a temporary Cell Radio Network Temporary Identifier (C-RNTI). Once the Random Access Preamble is transmitted and regardless of the possible occurrence of a measurement gap, the UE monitors the PDCCH for RA response identified by the RA-RNTI. The RA response window starts at the subframe that contains the end of the preamble transmission plus three subframes and has length RA-ResponseWindowSize subframes.

In a third step, the UE conveys a Layer 2/Layer 3 (L2/L3) message on the UL, which may be known as message3 or msg3. More specifically, the UE conveys the actual random access procedure message on the PUSCH, such as an RRC connection request, tracking area update, or scheduling request. The message is addressed to the temporary C-RNTI allocated in the RAR in the second step described above. The UE identity is also included in this message for use later by the eNB. If the UE is in the RRC connected state, the UE identity is the C-RNTI assigned to the UE, otherwise the UE identity is a core-network terminal identifier.

In a fourth step, a contention resolution message is transmitted on the DL, which may be known as message4 or msg4. The contention resolution message is addressed to the C-RNTI (if indicated in msg3) or to the temporary C-RNTI and, in the latter case, echoes the UE identity contained in msg3. In case of a collision followed by successful decoding of msg3, the HARQ feedback is transmitted only by the UE which detects its own UE identity (or C-RNTI); other UEs understand there was a collision. After contention resolution, the C-RNTI may be used by the eNB to address the UE that successfully completed the initial random access.

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several APs using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be degraded. FIG. 5 illustrates a general illustration of the listen before talk (LBT) procedure.

Typically, the spectrum used by LTE is dedicated to LTE. This has the advantage that LTE system is not concerned about coexistence issues or uncertainties in channel access. As a result, the spectrum efficiency can be maximized. However, the spectrum allocated to LTE is limited and is not always able to meet the ever-increasing demand for larger throughput from applications/services. Therefore, a new industry forum has been initiated to extend LTE to operate entirely on the unlicensed spectrum in a standalone mode, which is referred to as "MuLTEfire" in marketing terms by certain sources. Unlicensed spectrum can, by definition, be simultaneously used by multiple different technologies. Therefore, LTE needs to consider the impact of LBT on UL procedures such as random access.

The existing RA procedure in LTE assumes complete subframes can always be transmitted and does not take into account the LBT process. Currently, the RA response from the eNB is scheduled using only the PDCCH, which will not be available if transmission is not feasible in the first three symbols of a DL subframe due to LBT. The channel access opportunities for standalone LTE-U may be very limited and transmission or reception of complete subframes may not be possible when LBT is a requirement.

SUMMARY

In certain embodiments, systems and methods provide a new random access (RA) procedure for initial access to a network by wireless devices. Placing RA responses within partial subframes allows for the use of listen-before-talk (LBT) for standalone LTE-U.

In a particular embodiment for example, a method by a network node is provided for transmitting a random access (RA) response. The method includes forming, by the network node, a first signal for transmission to a wireless device. Forming the first signal may include placing a RA response message within a first partial subframe of the first signal. The first partial subframe may include a control data portion of a Physical Downlink Control Channel (PDCCH) message. The method may further include transmitting, by the network node, the first signal to the wireless device.

In a particular embodiment, a network node for transmitting random access (RA) response may include a memory storing instructions and a processor operable to execute the instructions to cause the processor to form a first signal for transmission to a wireless device. Forming the first signal may include placing a RA response message within a first partial subframe of the first signal, the first partial subframe comprising a control data portion of a Physical Downlink Control Channel (PDCCH) message. The first signal may be transmitted to the wireless device.

In a particular embodiment, a method by a wireless device for receiving a random access (RA) response from a network node is provided. The method includes receiving, by the wireless device, a first signal indicating that a second signal to be subsequently received by the wireless device comprises a first partial subframe. The wireless device receives the second signal. The second signal may include a RA response message within the first partial subframe. The first partial subframe may include a control data portion of a Physical Downlink Control Channel (PDCCH) message. The wireless device may identify the RA response message within the first partial subframe based on the first signal.

In a particular embodiment, a wireless device for receiving a random access (RA) response from a network node includes a memory storing instructions and a processor operable to execute the instructions to cause the processor to receive a first signal indicating that a second signal to be subsequently received by the wireless device comprises a first partial subframe. The second signal may be received and may include a RA response message within the first partial subframe. The first partial subframe includes a control data portion of a Physical Downlink Control Channel (PDCCH) message. The RA response message may be identified within the first partial subframe based on the first signal.

Some embodiments of the disclosure may provide one or more technical advantages. For example, in certain embodiments, the systems and methods may enhance the efficiency of LBT before preamble transmission. Another advantage may be that additional downlink (DL) transmission opportunities are provided for the network node to complete the initial access procedure. Still another advantage may be improved network performance of standalone LTE-U in densely loaded scenarios.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which:

FIG. 14 illustrates an example virtual computing apparatus using partial subframe transmissions for standalone LTE-U, according to certain embodiments.

FIG. 23 illustrates another example alternative virtual computing apparatus using partial subframe transmissions for standalone LTE-U, according to certain embodiments;

DETAILED DESCRIPTION

In certain embodiments, systems and methods provide a new random access (RA) procedure for initial access to a network by a wireless device. The new procedure better incorporates listen before talk (LBT) and can operate with partial subframe transmissions for standalone LTE in Unlicensed Spectrum (LTE-U). It is recognized, however, that the disclosed RA methods are applicable to both standalone LTE-U and Licensed-Assisted Access (LAA) with uplink (UL), and to both frequency-division duplexing (FDD) and time-division duplexing (TDD) frame structures or their carrier aggregation.

In certain embodiments described below, one or both of the Physical Random Access Channel (PRACH) and Physical Uplink Shared Channel (PUSCH) transmissions during the initial access may be distributed across non-contiguous frequency resources which span a fraction of the UL system bandwidth, and have a configurable, periodic spacing between the non-contiguous frequency resources. In certain embodiments, the PUSCH transmission may make use of a convolutional code or a turbo code.

Figure 1:
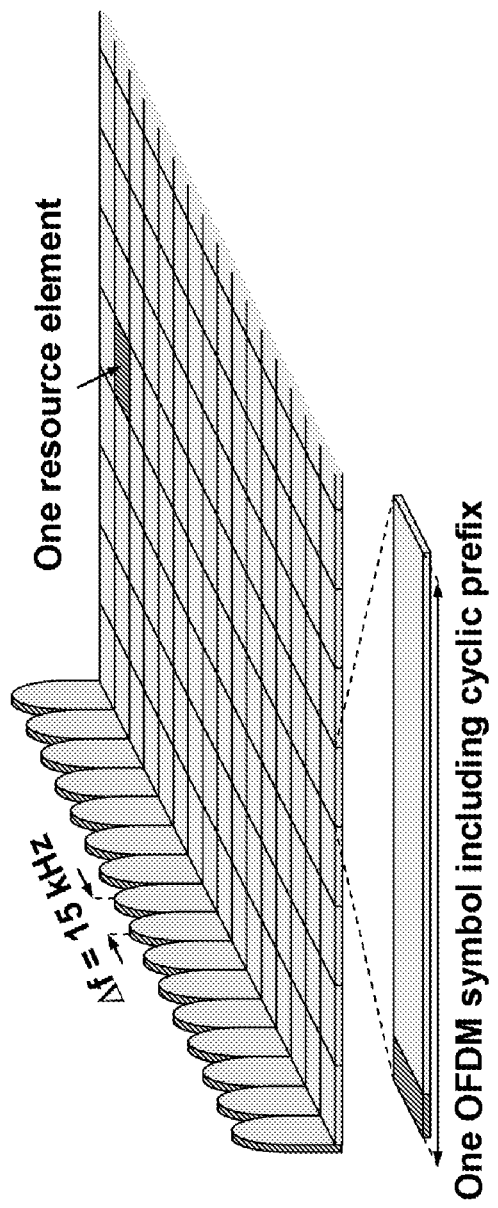
FIG. 1 illustrates a basic LTE downlink physical resource as a time-frequency grid.
Figure 2:
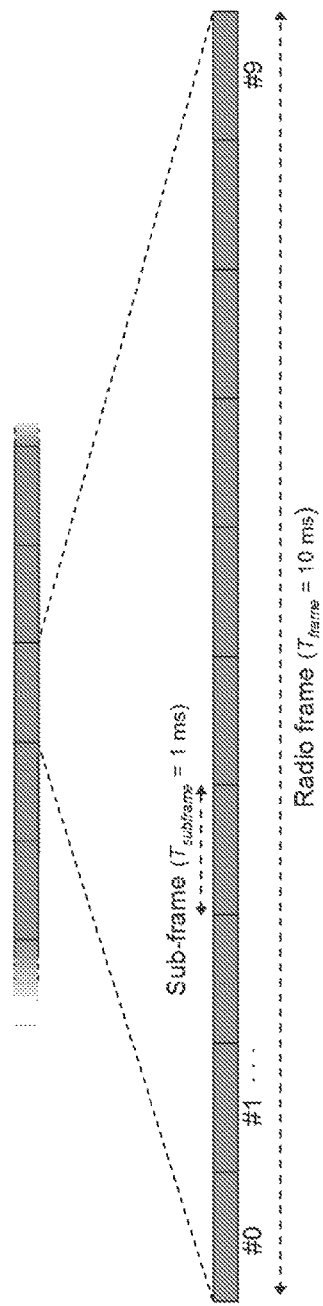
FIG. 2 illustrates an example LTE time-domain structure.
Figure 3:
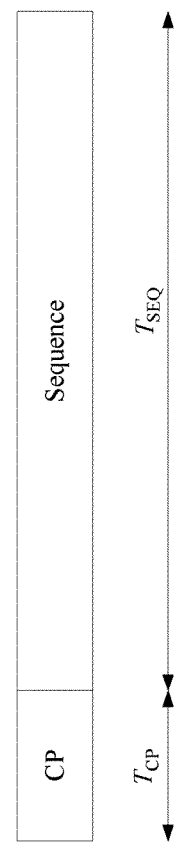
FIG. 3 illustrates an example random access preamble format.
Figure 4:
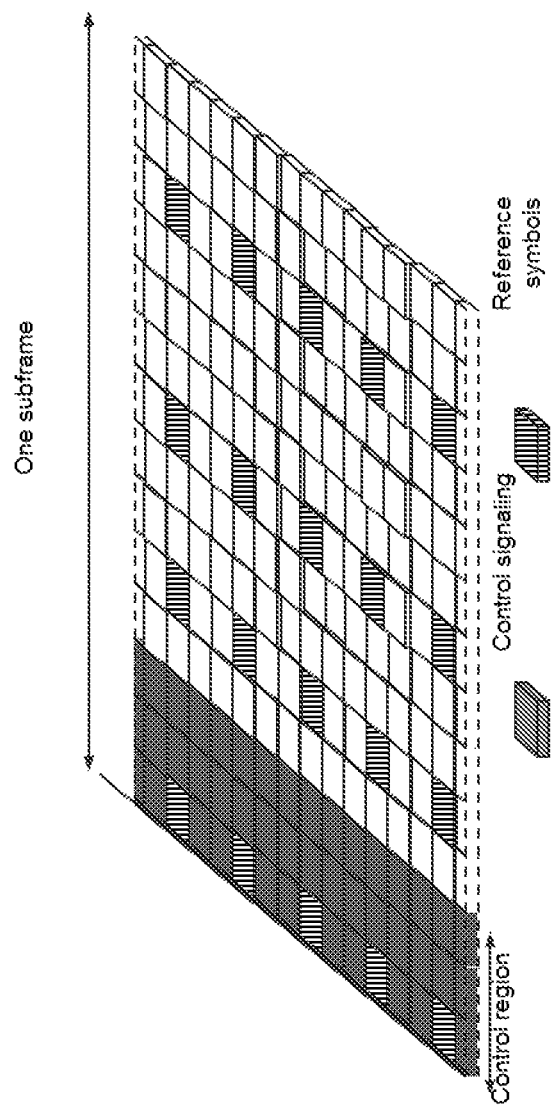
FIG. 4 illustrates an example downlink subframe.
Figure 5:
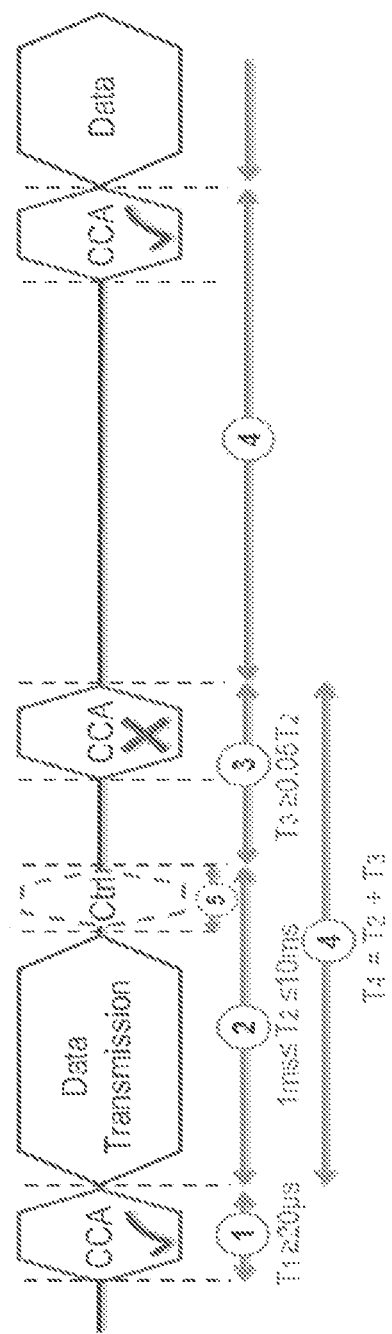
FIG. 5 illustrates an example listen before talk procedure.
Figure 6:
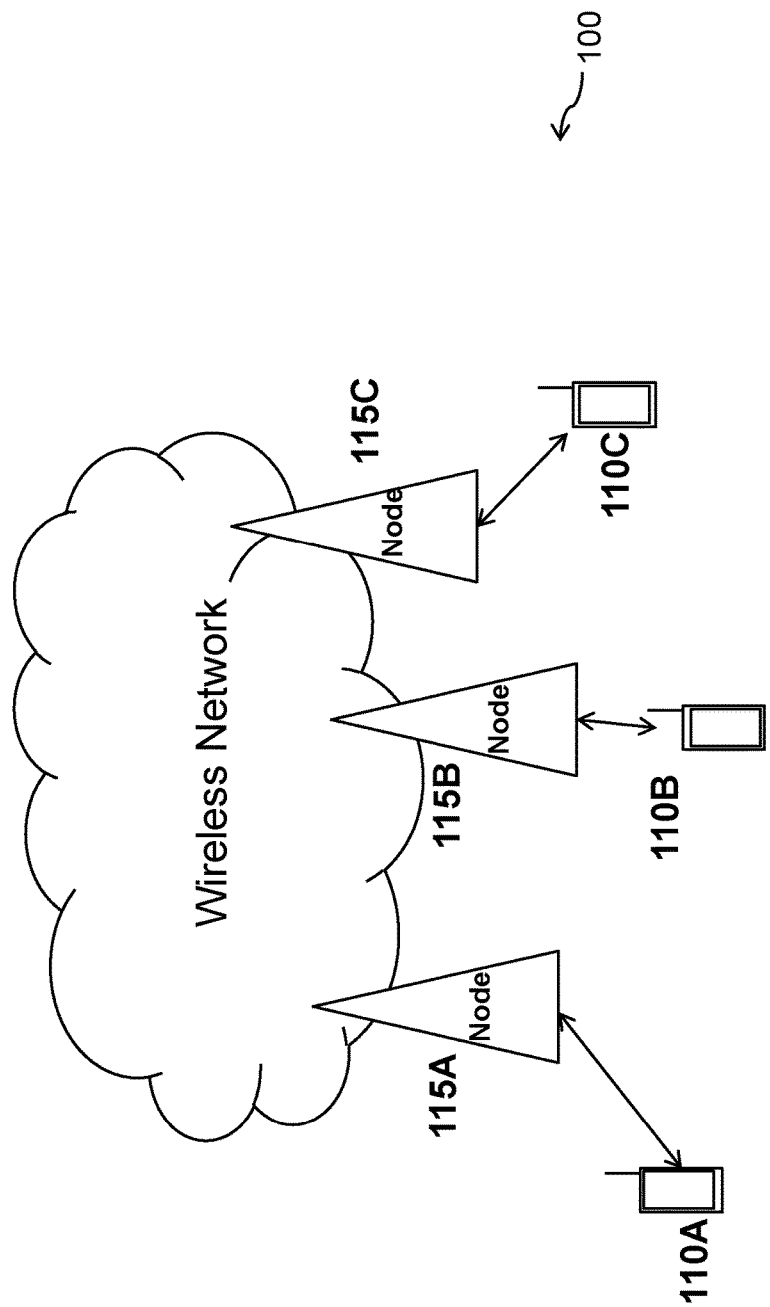
FIG. 6 illustrates an example wireless network using partial subframe transmissions for standalone LTE-U, according to certain embodiments.

Particular embodiments are described in FIGS. 1-25 of the drawings, like numerals being used for like and corresponding parts of the various drawings. FIG. 6 is a block diagram illustrating embodiments of a network 100 for using partial subframe transmissions for standalone LTE-U, according to certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 6). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, a core network node (not depicted in FIG. 6) may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of network nodes 115, wireless devices 110, and other network nodes are described in more detail with respect to FIGS. 7 and 12, respectively.

Although FIG. 6 illustrates a particular arrangement of wireless network 100, the present disclosure contemplates that the various embodiments described herein may be applied to a variety of networks having any suitable configuration. For example, wireless network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The partial-subframe transmission techniques described herein are applicable to both LAA LTE and standalone LTE operation in license-exempt channels. The described techniques are generally applicable for transmissions from both network nodes 115 and wireless devices 110.

Figure 7:
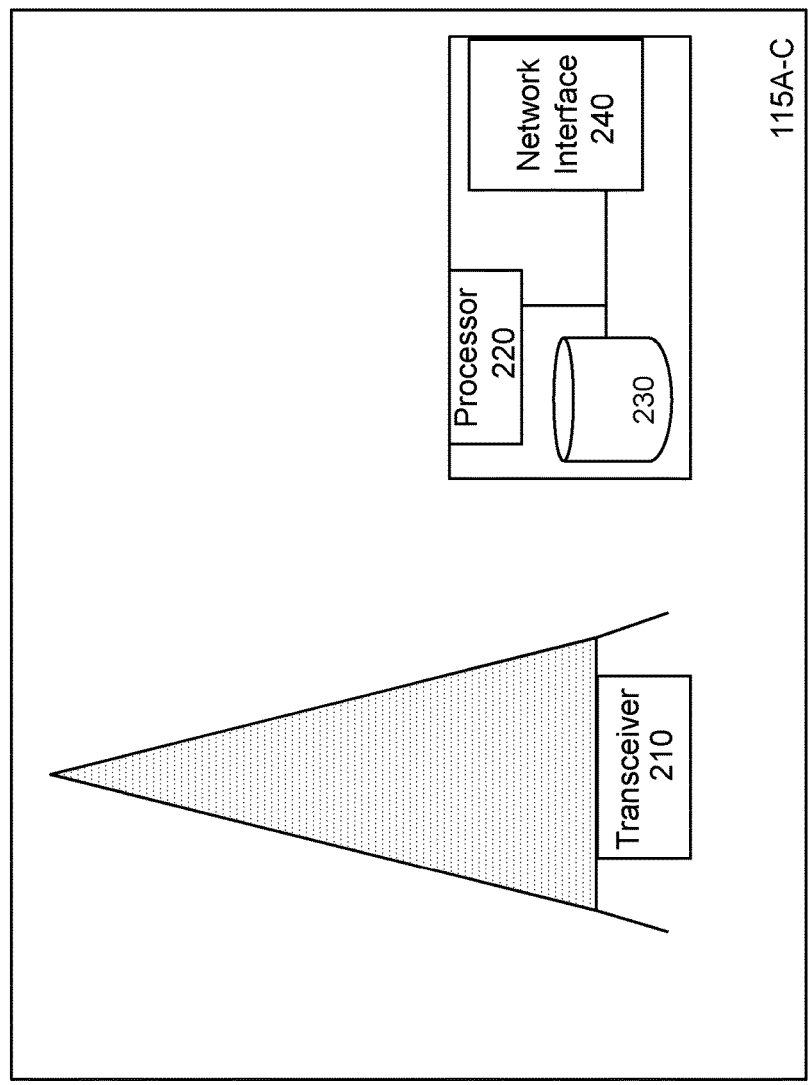
FIG. 7 illustrates an example network node using partial subframe transmissions for standalone LTE-U, according to certain embodiments.

FIG. 7 is a block diagram illustrating certain embodiments of a network node 115 using partial subframe transmissions for standalone LTE-U. Examples of network node 115 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Network nodes 115 may be deployed throughout wireless network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 210, processor 220, memory 230, and network interface 240. In some embodiments, transceiver 210 facilitates transmitting wireless signals to and receiving wireless signals from wireless devices 110 (e.g., via an antenna), processor 220 executes instructions to provide some or all of the functionality described above as being provided by a network node 115, memory 230 stores the instructions executed by processor 220, and network interface 240 communicates signals to backend network components, such as a gateway, switch, router, Internet, Public Switched Telephone Network (PSTN), core network nodes 130, radio network controllers 120, etc.

Processor 220 may include any suitable combination of hardware and software implemented in one or more modules to execute instructions and manipulate data to perform some or all of the described functions of network node 115. In some embodiments, processor 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 240 is communicatively coupled to processor 220 and may refer to any suitable device operable to receive input for network node 115, send output from network node 115, perform suitable processing of the input or output or both, communicate to other devices, or any combination of the preceding. Network interface 240 may include appropriate hardware (e.g., port, modem, network interface card, etc.) and software, including protocol conversion and data processing capabilities, to communicate through a network.

Other embodiments of network node 115 may include additional components beyond those shown in FIG. 7 that may be responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

In certain embodiments, network node 115 may transmit a RA response message after receiving an initial UL transmission of a RA request message from wireless device 110. Typically, RA procedures required the RA response message to be transmitted in full subframes on the Physical Data Shared Channel (PDSCH). According to certain embodiments disclosed herein, however, the RA response may be sent on the Physical Downlink Control Channel (PDCCH) or the Enhanced Physical Downlink Control Channel (EPD-CCH) instead in various embodiments.

Figure 8:
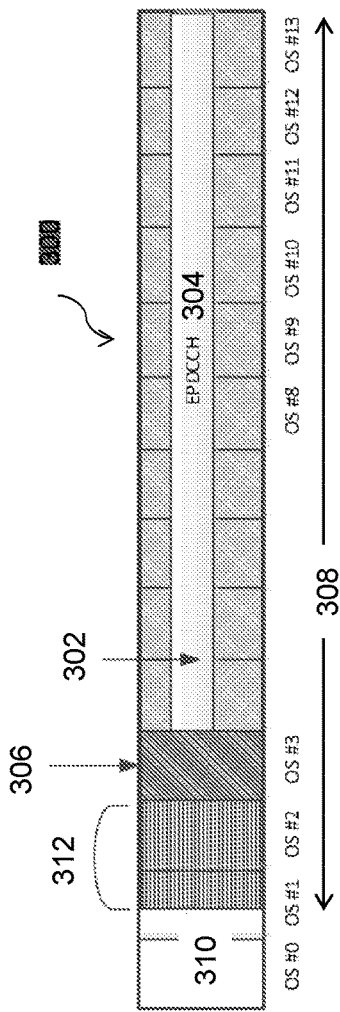
FIG. 8 illustrates an example random access (RA) response on Enhanced Physical Downlink Control Channel (EPDCCH) in downlink (DL) with partial subframe puncturing of a few symbols, according to certain embodiments.

FIG. 8 illustrates an example subframe 300 for transmission of RA response 302 a on PDCCH or EPDCCH 304 with partial subframe puncturing of a few symbols. Since the EPDCCH 304 can start from the third OFDM symbol 306, the RA response 302 can be transmitted within a DL partial subframe 308. In certain embodiments, transmitting the RA response 302 in a partial subframe 308 allows the PDCCH or EPDCCH 304 control region to be punctured due to LBT. As depicted, the partial subframe 308 consists of the last twelve symbols plus a fractional symbol. The first OFDM symbol and a fractional part of the second OFDM sybmol may be used for Clear Channel Assessment (CCA) 310. A second fractional part of the second OFDM symbol and a third OFDM sybmol may be used for DL reference symbols (RS) 312.

Figure 9:
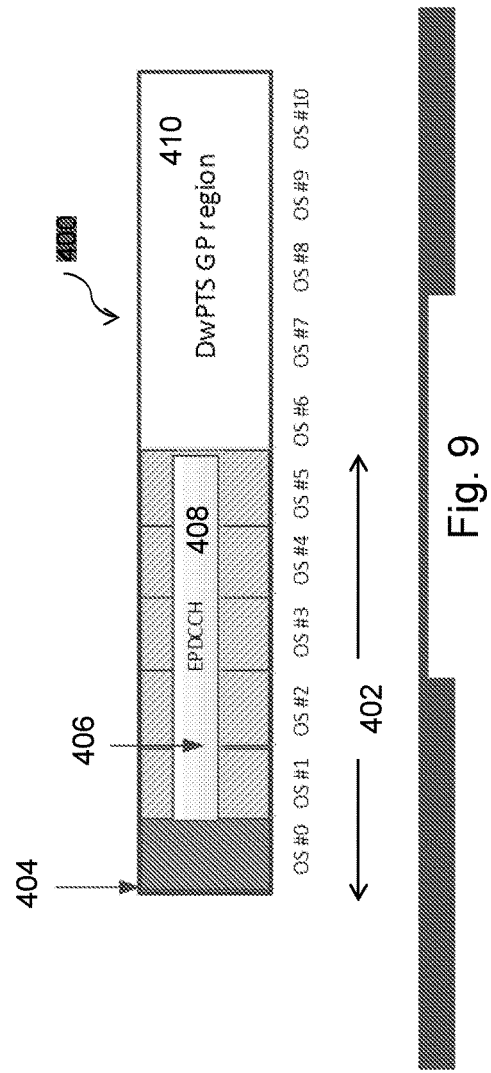
FIG. 9 illustrates an alternative example RA response in DL with partial subframe with downlink pilot time slot (DwPTS) structure, according to certain embodiments.

FIG. 9 illustrates an example subframe 400 where the partial subframe 402 consists of the first six symbols. In this example embodiment, the initial signal 404 begins at the first OFDM symbol and the RA response 406 begins at the third OFDM sybmol. The PDCCH or EPDCCH 408 control region is included in the second through sixth OFDM symbols. Additionally, the depicted embodiment includes a downlink pilot time slot guard period (DwPTS GP) 410. In such an embodiment, a downlink pilot time slot (DwPTS) mapping may be used for the resource elements. For partial subframes with a DwPTS structure, the remainder of the guard period may be truncated arbitrarily. The partial subframe based on a DwPTS mapping may be between three to twelve symbols in length, in certain embodiments, for example.

In either of the embodiments depicted in FIGS. 8 and 9, the RA response 302, 406 may be addressed to a UE identifier such as the Random Access Radio Network Temporary Identifier (RA-RNTI), for example. The RA response 302, 406 sent on the EPDCCH 304, 408 may require the definition of a common search space for the EPDCCH 304, 408. In the initial access stage, wireless device 110 may assume only one EPDCCH set is available. The starting symbol of the EPDCCH 304, 408 used for RA responses 302, 406 may be indicated via eNB system information, or be pre-defined and limited to one of several values.

Figure 10:
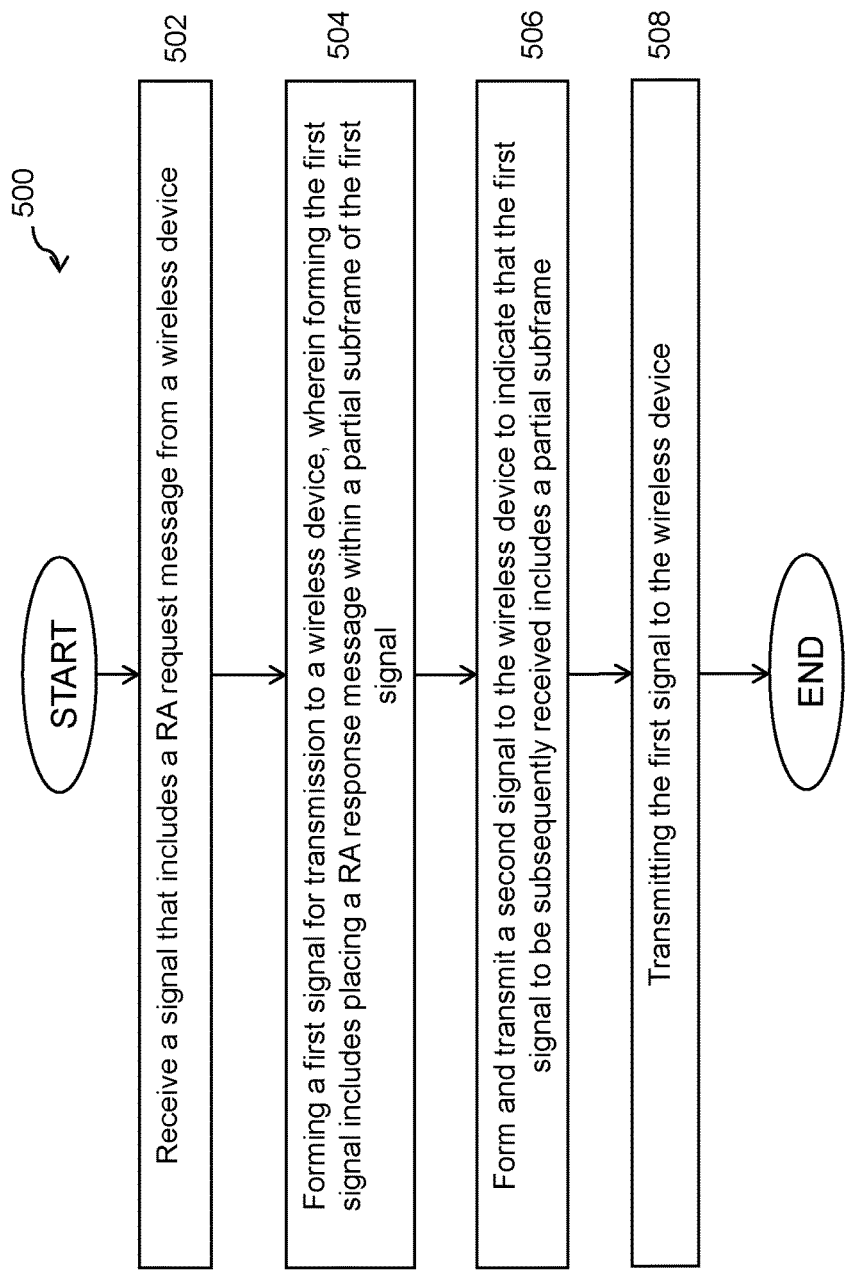
FIG. 10 illustrates an example method by a network node using partial subframe transmissions for standalone LTE-U, according to certain embodiments.

FIG. 10 illustrates an example method 500 by a network node 115 using partial subframe transmissions for stand-alone LTE-U, according to certain embodiments. The method may begin at step 502 when network node 115 receives a signal from the wireless device 110. The signal may include a RA request message on an UL PRACH from wireless device 110.

At step 504, network node 116 forms a first signal for transmission to wireless device 110. Specifically, for example, forming the first signal may include placing a RA response message 302, 406 within a first partial subframe 308, 402 of the first signal. In certain embodiments, the first partial subframe 308, 402 may include a control data portion of a PDCCH or EPDCCH message 304, 408. In a particular embodiment, the first signal may be formed similar to the example subframe 300 depicted in FIG. 8. In another embodiment, the first signal may be formed similar to the example subframe 400 depicted in FIG. 9. Thus, the partial subframe may have a length between three OFDM symbols and 12 OFDM symbols, in various embodiments.

At step 506, network node 115 may form and transmit a second signal to the wireless device 110. The second signal may indicate that the first signal to be susequently transmitted by network node 115 includes a first partial subframe. As a result, wireless device 110 may be aware of a subsequently incoming partial subframe and be looking for it. In a particular embodiment, for example, the second signal may identify the OFDM symbol where the first partial subframe begins within the first signal. In another particular embodiment, the second signal may include a mapping that indicates to wireless device 110 that the first partial subframe is of a predefined length of OFDM symbols.

At step 508, network node 115 transmits the first signal to the wireless device 110.

Figure 11:
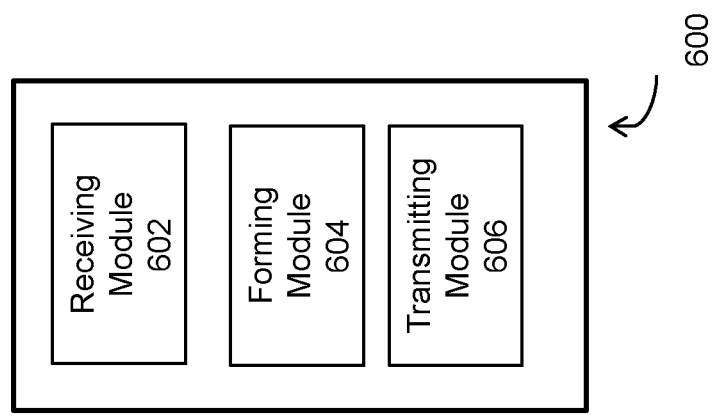
FIG. 11 illustrates an example virtual computing apparatus using partial subframe transmissions for standalone LTE-U, according to certain embodiments.

In certain embodiments, the methods for using partial subframe transmissions for standalone LTE-U as described above may be performed by one or more virtual computing devices. FIG. 11 illustrates an example virtual computing device using partial subframe transmissions for standalone LTE-U, according to certain embodiments. In certain embodiments, virtual computing device 600 may include modules for performing steps similar to those described above with regard to the method illustrated and described in FIG. 10. For example, virtual computing device 600 may include at least one receiving module 602, at least one forming module 604, at least one transmitting module 606, and any other suitable modules for transmitting RA response messages in partial subframes. In some embodiments, one or more of the modules may be implemented using one or more processors 220 of FIG. 7. In certain embodiments, the functions of two or more of the various modules may be combined into a single module.

The receiving module 602 may perform the receiving functions of virtual computing device 600. For example, in a particular embodiment, receiving module 602 may receive a signal that includes a signal from a wireless device. In certain embodiments, the signal may include a RA request message received on an uplink PRACH.

The forming module 604 may perform the forming functions of virtual computing device 600. For example, in a particular embodiment, forming module 604 may form a first signal for transmission to wireless device 110. Such forming may include placing a RA response message within the partial subframe of the first signal. In certain embodiments, and as another example, forming module 604 may additionally form a second signal to indicate to wireless device 110 that the first signal includes the RA response within the partial subframe.

The transmitting module 606 may perform the transmitting functions of virtual computing device 600. For example, in certain embodiments, transmitting module 606 may transmit the first signal to wireless device 110. In certain embodiments and prior to transmitting the first signal, transmitting module 606 may also transmit the second signal to wireless device 110. The second signal may indicate that the first signal will include a RA response within the partial subframe.

Other embodiments of computer networking virtual apparatus 600 may include additional components beyond those shown in FIG. 11 that may be responsible for providing certain aspects of the network node's 115 functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

Figure 12:
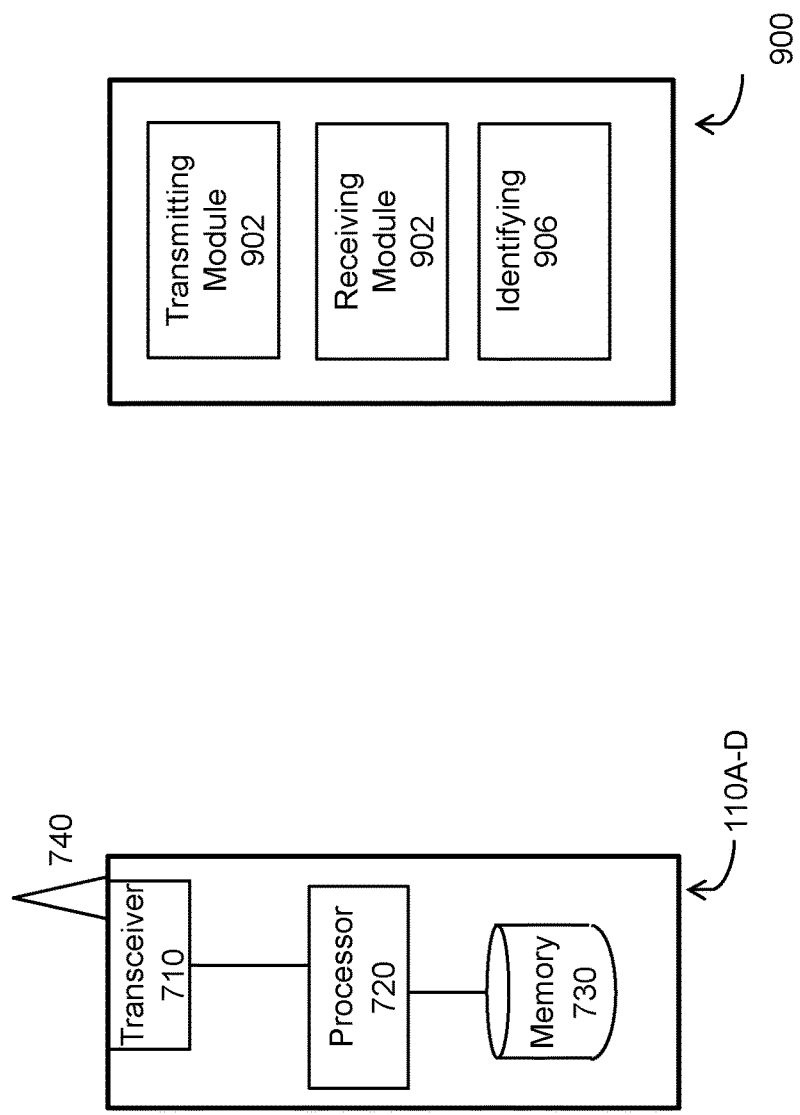
FIG. 12 illustrates an example wireless device for receiving partial subframe transmissions for standalone LTE-U, according to certain embodiments.

FIG. 12 illustrates an example wireless device 110 for receiving a RA response transmitted in a partial subframe, in accordance with certain embodiments. As depicted, wireless device 110 includes transceiver 710, processor 720, and memory 730. In some embodiments, transceiver 710 facilitates transmitting wireless signals to and receiving wireless signals from network node 115 (e.g., via an antenna), processor 720 executes instructions to provide some or all of the functionality described above as being provided by wireless device 110, and memory 730 stores the instructions executed by processor 720. Examples of a wireless device 110 are provided above.

Processor 720 may include any suitable combination of hardware and software implemented in one or more modules to execute instructions and manipulate data to perform some or all of the described functions of wireless device 110. In some embodiments, processor 720 may include, for example, one or more computers, one or more central processing units (CPUs), one or more microprocessors, one or more applications, circuitry, and/or other logic.

Memory 730 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 12 that may be responsible for providing certain aspects of the wireless device's functionality, including any of the functionality described above and/or any additional functionality (including any functionality necessary to support the solution described above).

Figure 13:
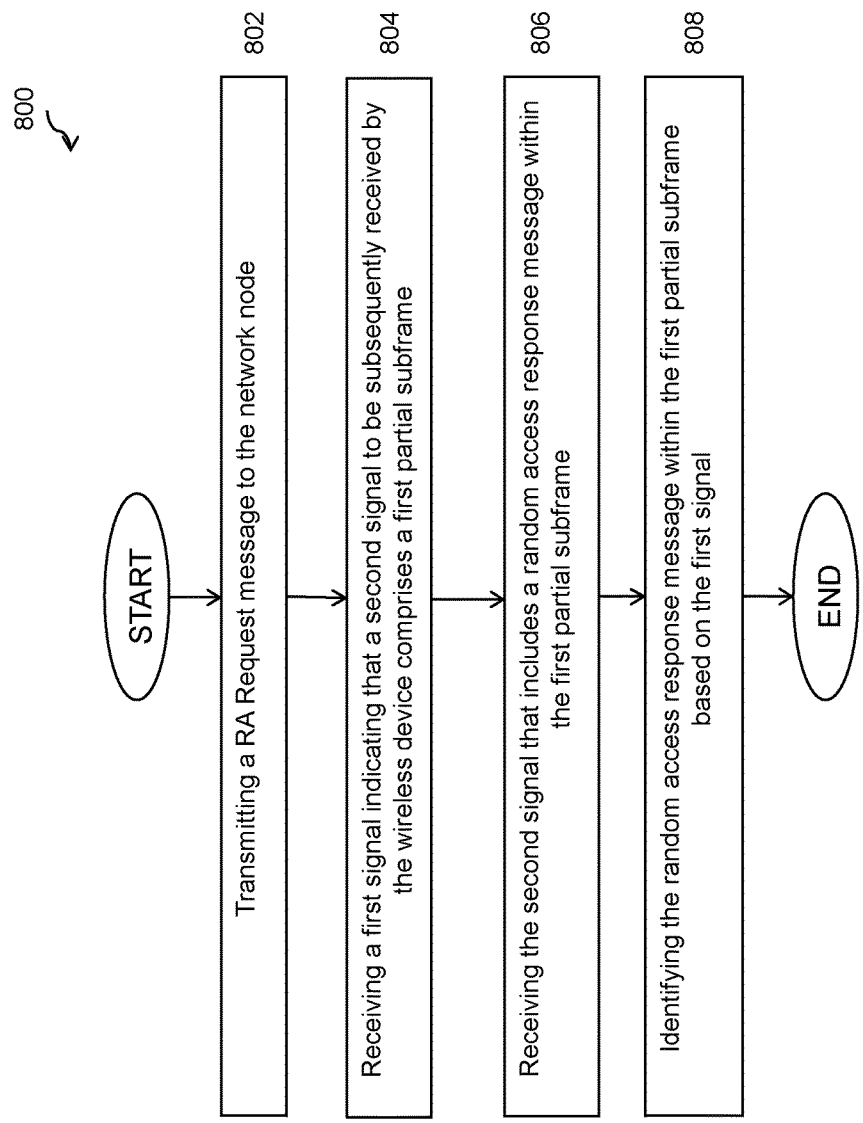
FIG. 13 illustrates an example method by a wireless device for receiving partial subframe for standalone LTE-U, according to certain embodiments.

FIG. 13 illustrates an example method 800 by a wireless device 110 for receiving partial subframe transmissions for standalone LTE-U, according to certain embodiments. The method may begin at step 802 when wireless device 110 transmits a signal to network node 115. The signal may include a RA request message transmitted on an uplink physical random access channel (PRACH) from the wireless device.

At step 804, wireless device 110 receives a first signal from network node 115. The first signal may indicate that a subsequently transmitted second signal includes a first partial subframe. In a particular embodiment, for example, the first signal may identify the OFDM symbol where the first partial subframe begins within the second signal. In another particular embodiment, the first signal may include a mapping that indicates to wireless device 110 that the first partial subframe in the second signal is of a predefined length of OFDM symbols.

At step 806, wireless device 110 receives the second signal from network node 115. The second signal may include a RA response message 302, 406 within the first partial subframe 308, 402 of the second signal. In certain embodiments, the first partial subframe 308, 402 may include a control data portion of a PDCCH or EPDCCH message 304, 408. In a particular embodiment, the second signal may be formed similar to the example subframe 300 depicted in FIG. 8. In another embodiment, the second signal may be formed similar to the example subframe 400 depicted in FIG. 9. Thus, the partial subframe may have a length between three OFDM symbols and 12 OFDM symbols, in various embodiments.

At step 808, wireless device 110 identifies the RA response message within the first partial subframe based on the second signal. Specifically, where the first signal received by the wireless device 110 identifies the OFDM symbol where the first partial subframe begins within the second signal, wireless device 110 may look in the identified OFDM symbol for the RA response message. In another particular embodiment, where the first signal includes a mapping that indicates to wireless device 110 that the first partial subframe received by wireless device 110 is of a predefined length of OFDM symbols, wireless device 110 may use the mapping to determine where the RA response message is located in the second signal.

In certain embodiments, the methods for receiving partial subframe transmissions for standalone LTE-U as described above may be performed by one or more virtual computing devices. FIG. 14 illustrates an example virtual computing device 900 using partial subframe transmissions for standalone LTE-U, according to certain embodiments. In certain embodiments, virtual computing device 900 may include modules for performing steps similar to those described above with regard to the method illustrated and described in FIG. 13. For example, virtual computing device 900 may include at least one transmitting module 902, at least one receiving module 904, at least one identifying module 906, and any other suitable modules for transmitting RA response messages in partial subframes. In some embodiments, one or more of the modules may be implemented using one or more processors 720 of FIG. 12. In certain embodiments, the functions of two or more of the various modules may be combined into a single module.

The transmitting module 902 may perform the transmitting functions of virtual computing device 900. For example, in a particular embodiment, transmitting module 902 may transmit a signal to network node 115. The signal may include a RA request message transmitted on an uplink physical random access channel (PRACH) from the wireless device.

The receiving module 904 may perform the receiving functions of virtual computing device 900. For example, in a particular embodiment, receiving module 904 may receive a first signal from network node 115. The first signal may indicate that a subsequently transmitted second signal includes a first partial subframe. In a particular embodiment, for example, the second signal may identify the OFDM symbol where the first partial subframe begins within the first signal. In another particular embodiment, the second signal may include a mapping that indicates to wireless device 110 that the first partial subframe is of a predefined length of OFDM symbols.

As another example, receiving module 904 may receive a second signal from network node 115. The second signal may include a RA response message 302, 406 within a first partial subframe 308, 402 of the second signal. In certain embodiments, the first partial subframe 308, 402 may include a control data portion of a PDCCH or EPDCCH message 304, 408. In a particular embodiment, the second signal may be formed similar to the example subframe 300 depicted in FIG. 8. In another embodiment, the second signal may be formed similar to the example subframe 400 depicted in FIG. 9. Thus, the partial subframe may have a length between three OFDM symbols and 12 OFDM symbols, in various embodiments.

The identifying module 906 may perform the identifying functions of virtual computing device 900. For example, in certain embodiments, identifying module 906 may identify the RA response message within the first partial subframe based on the second signal. In one particular embodiment where the first signal identifies the OFDM symbol where the first partial subframe begins within the second signal, identifying module 906 may look in the identified OFDM symbol of the second signal for the RA response message. In another particular embodiment, where the first signal includes a mapping that indicates the first partial subframe is of a predefined length of OFDM symbols, identifying module 906 may use the mapping to determine where the RA response message is located in the second signal.

Other embodiments of computer networking virtual apparatus 900 may include additional components beyond those shown in FIG. 14 that may be responsible for providing certain aspects of the wireless device's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Figure 15:
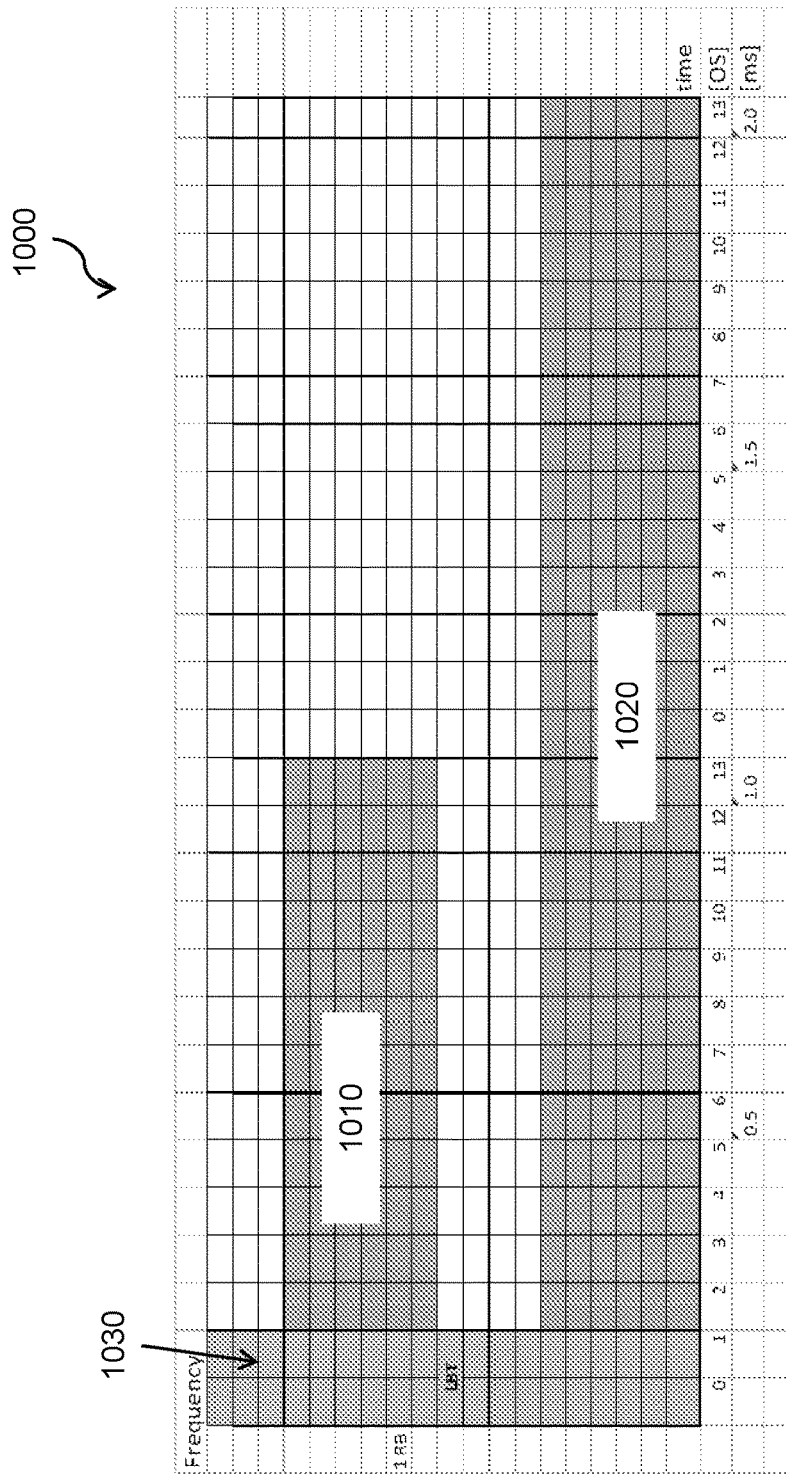
FIG. 15 illustrates example RA resources within a window of uplink (UL) subframes used for Physical Random Access Channel (PRACH), according to certain embodiments.

Conventionally, FDD frame structure types do not allow multiple Random Access Channel (RACH) resources to be defined within a window of two UL subframes. However, certain embodiments provide that multiple random access resources may be made available within the same window of UL subframes in order to increase the number of initial access opportunities. As an example, FIG. 15 illustrates multiple RA resources within a window of UL subframes 1000 used for Physical Random Access Channel (PRACH). As depicted, a first RACH resource 1010 and a second RACH resource 1020 are defined within window 1000. The first UL subframe is a partial subframe with puncturing at the beginning of the subframe for a LBT procedure 1030, as an example. Alternatively, the UL partial subframe may have puncturing located at the end of the subframe.

Figure 16:
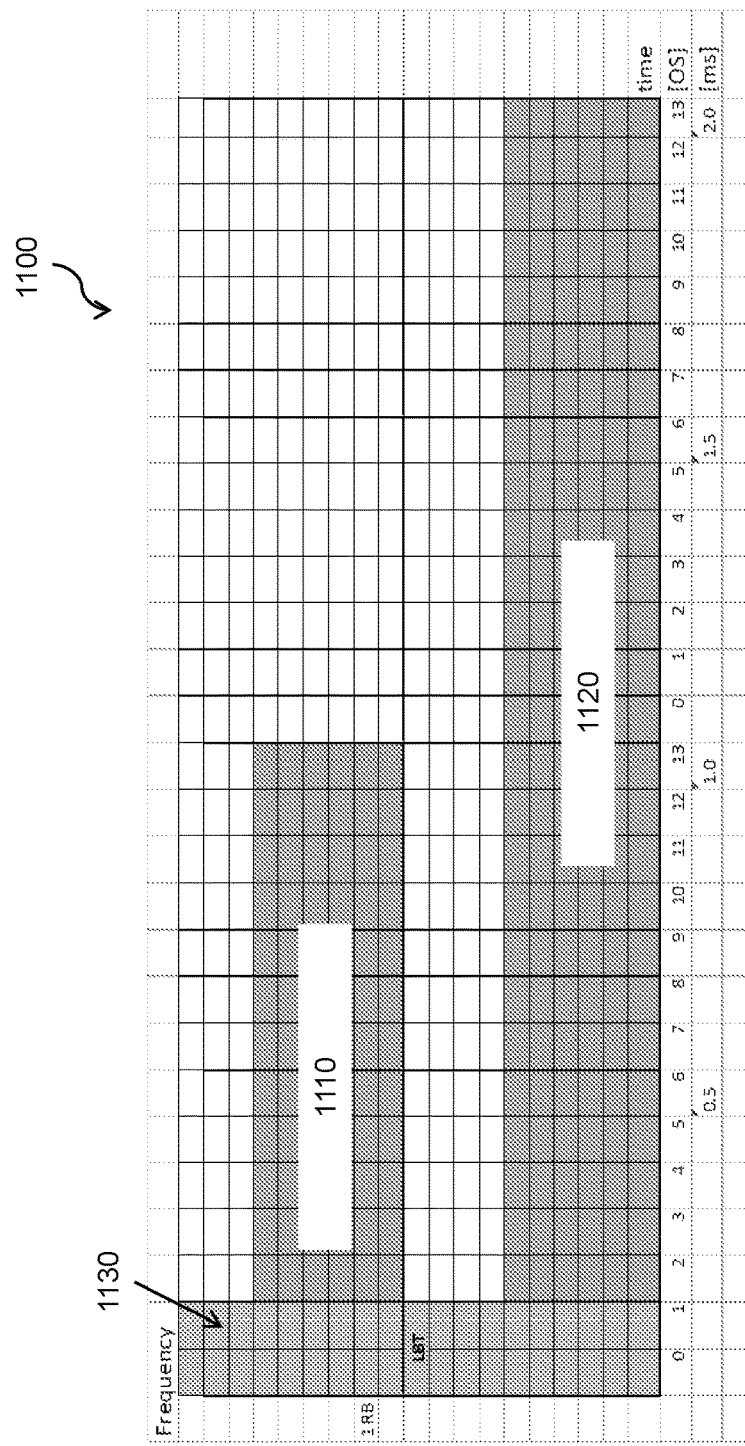
FIG. 16 illustrates example random access (RA) resources used for Physical Uplink Shared Channel (PUSCH), according to certain embodiments.

In certain embodiments, the multiple RA resources may be utilized for PUSCH transmissions carrying a RRC connection request, without preamble transmission. FIG. 16 illustrates example multiple RA resources being allocated to a single subframe 1100 for PUSCH, according to certain embodiments. As depicted, puncturing for a LBT process 1120 is shown at the beginning of the subframe 1100. In other embodiments, the UL partial subframe 1100 may have puncturing located at the end of the subframe 1100.

In another aspect of this embodiment, the PRACH or PUSCH initial access resources may be distributed across non-contiguous frequency resources which span a fraction of the UL system bandwidth, and have a configurable, periodic spacing between the non-contiguous frequency resources.

Figure 17:
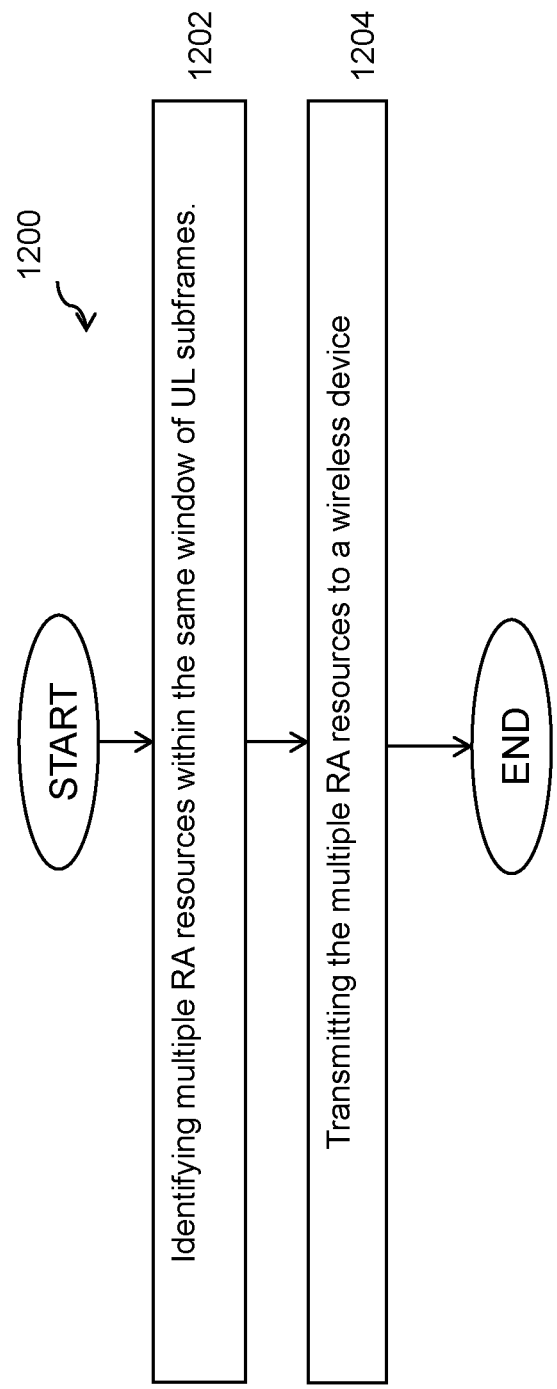
FIG. 17 illustrates an example method by a network node for assigning RA resources, according to certain embodiments.

FIG. 17 illustrates an example method 1200 by a network node 115 for assigning RA resources for standalone LTE-U, according to certain embodiments. The method may begin at step 1202 when network node 115 identifies multiple RA resources within the same window of UL subframes. In certain embodiments, two RACH resources may be defined within a window of two UL subframes. In certain embodiments, a first UL subframe may be a partial subframe with puncturing at the beginning of the subframe. In certain other embodiments, the first UL subframe may be a partial subframe with puncturing at the end of the subframe.

At step 1204, network node 115 transmits the multiple RA resources to wireless device 110. The multiple random access resources may be utilized for PUSCH transmissions carrying a RRC connection request, in certain embodiments. Additionally, the PRACH or PUSCH initial access resources may be distributed across non-contiguous frequency resources which span a fraction of the UL system bandwidth.

Figure 18:
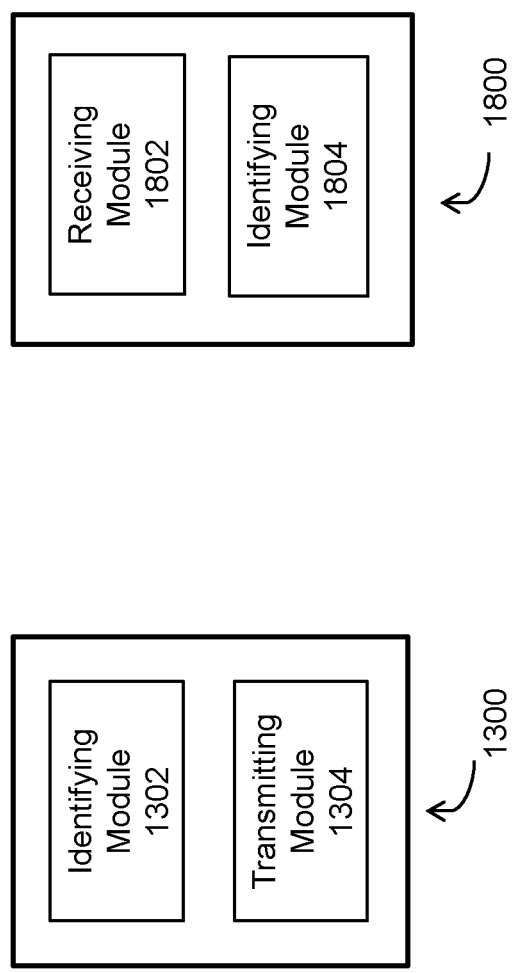
FIG. 18 illustrates an example virtual computing apparatus for assigning RA resources, according to certain embodiments.

In certain embodiments, the methods for assigning RA resources for standalone LTE-U as described in FIG. 17 may be performed by one or more virtual computing devices. FIG. 18 illustrates an example virtual computing device 1300 for assigning RA resources for standalone LTE-U, according to certain embodiments. In certain embodiments, virtual computing device 1300 may include modules for performing steps similar to those described above with regard to the method illustrated and described in FIG. 17. For example, virtual computing device 1300 may include at least one identifying module 1302, at least one transmitting module 1304, and any other suitable modules for assigning RA resources for standalone LTE-U. In some embodiments, one or more of the modules may be implemented using one or more processors 220 of FIG. 7. In certain embodiments, the functions of two or more of the various modules may be combined into a single module.

The identifying module 1302 may perform the identifying functions of virtual computing device 1300. For example, in a particular embodiment, identifying module 1302 may identify multiple RA resources within the same window of UL subframes. In certain embodiments, two RACH resources may be defined within a window of two UL subframes. In certain embodiments, a first UL subframe may be a partial subframe with puncturing at the beginning of the subframe. In certain other embodiments, the first UL subframe may be a partial subframe with puncturing at the end of the subframe.

The transmitting module 1304 may perform the transmitting functions of virtual computing device 1300. For example, transmitting module 1304 may transmit the multiple RA resources to wireless device 110. In a particular embodiment, the multiple RA resources may include multiple PRACH resources. In another particular embodiment, the multiple RA resources may include multiple PUSCH resources to be utilized for PUSCH transmissions carrying a RRC connection request. In certain embodiments, the PRACH or PUSCH initial access resources may be distributed across non-contiguous frequency resources which span a fraction of the UL system bandwidth.

Other embodiments of computer networking virtual apparatus 1300 may include additional components beyond those shown in FIG. 18 that may be responsible for providing certain aspects of the network node's 115 functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

Figure 19:
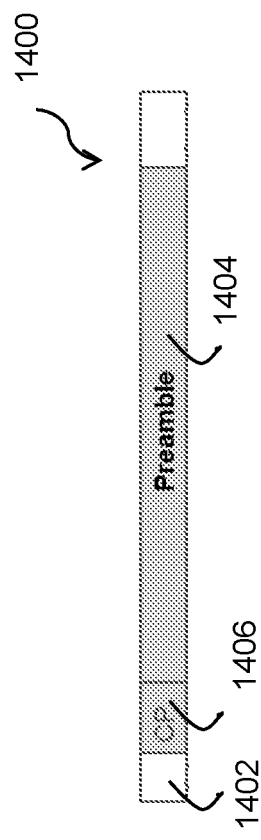
FIG. 19 illustrates an example uplink Physical Random Access Channel (PRACH) transmission after an uplink listen-before-talk (LBT) step in a RA procedure, according to certain embodiments

In certain other alternative embodiments, a portion of the PRACH preamble guard period may be moved to the beginning of the first subframe containing the preamble, which can be utilized for sensing the channel in order to perform LBT. FIG. 19 illustrates an example PRACH transmission 1400 after an uplink listen before talk step in a RA procedure, according to certain embodiments. As illustrated, a portion of the PRACH preamble guard period 1402 is moved to the beginning of the first subframe containing the preamble 1404. This guard period prefix may be utilized for sensing the channel in order to perform LBT. The PRACH may span an entire subframe or a partial subframe due to the LBT. In certain embodiments, the duration of the guard period 1402 used for LBT may range from one or more CCA slots of example duration 9 μs each, or be of duration equivalent to inter-frame spaces utilized by other coexisting technologies, or some combination of the two. If the LBT process is completed before the end of the initial guard period 1402, the UL preamble transmission commences immediately, starting with the cyclic prefix (CP) 1406.

In certain embodiments, if a shorter preamble is sent within a partial subframe, the shorter preamble may be based on the existing LTE preamble format 4, or be constructed based on repetitions of a short sequence, where an example duration of the short sequence is one Single Carrier-Frequency Division Multiple Access (SC-FDMA) symbol. In a particular embodiment, the CP used for the preamble may be shortened compared to the existing normal CP duration, in order to provide listening opportunities for LBT.

In certain embodiments, the timing $T_p$ of the preamble in relation to the start of the sub-frame must be known by the eNodeB. Here, the "start of the sub-frame" is the time instant as measured by the UE in downlink, which might be delayed compared to the "start of the subframe" in eNB, due to propagation time from eNB to UE.

Several different possible starting positions $T_p$ might be needed due to LBT. The eNB must be able to identify which starting position which was used, e.g. based upon using different PRACH preamble sequences for different starting positions.

Figure 20:
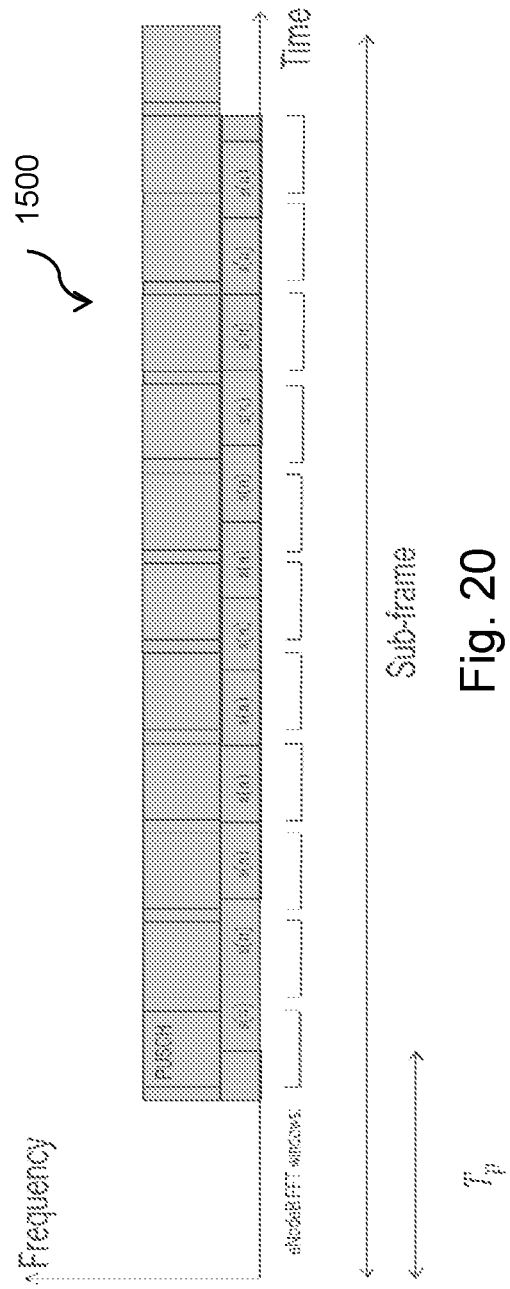
FIG. 20 illustrates example uplink PRACH and PUSCH transmissions after an uplink LBT step in a RA procedure, according to certain embodiments.
Figure 21:
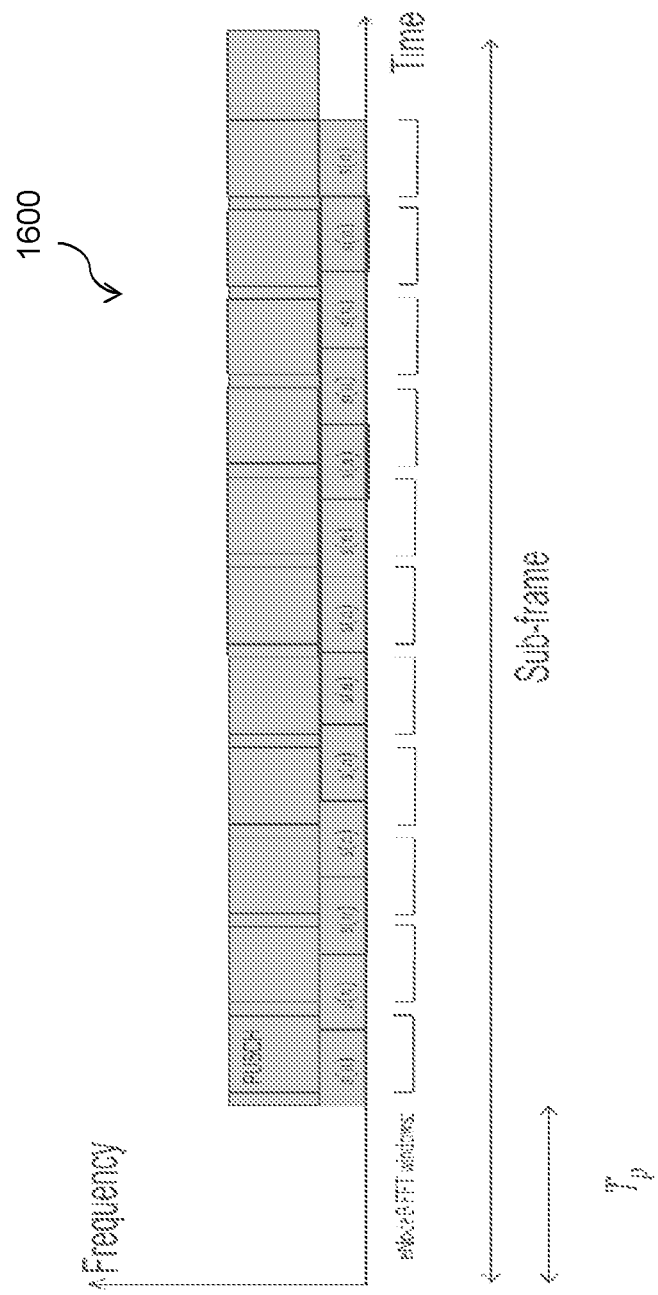
FIG. 21 illustrates example uplink PRACH and PUSCH transmissions after an LBT step in a RA procedure, according to certain other embodiments.

FIGS. 20 and 21 illustrate alternative examples for shortening the PRACH preamble for LBT. Specifically, FIG. 20 illustrates an example subframe 1500 where the PRACH preamble is constructed by repetition of a short sequence. As illustrated, the repetition of short sequences can be truncated due to LBT. FIG. 21 illustrates another example subframe 1600 where the sequence of repletion of a short sequence is delayed due to LBT, according to certain other embodiments.

Figure 22:
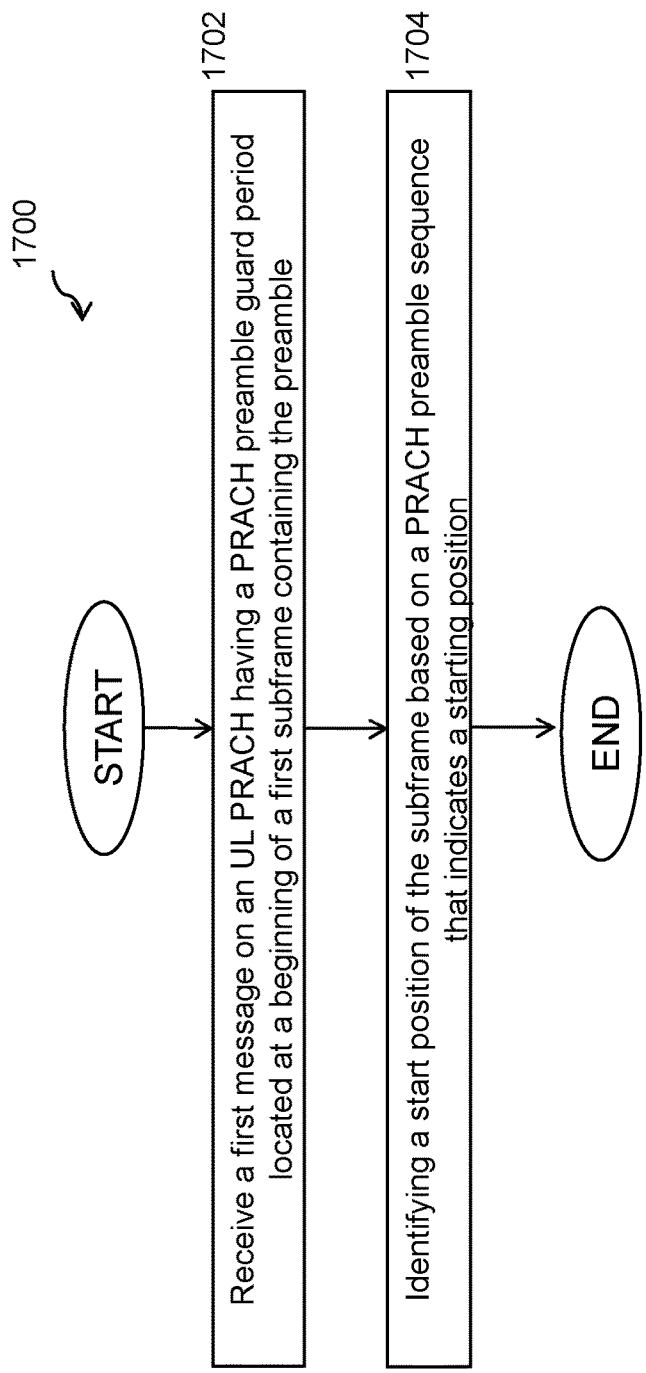
FIG. 22 illustrates an example alternative method by a network node using partial subframe transmissions for standalone LTE-U, according to certain embodiments.

FIG. 22 illustrates an example method 1700 by a network node 115 using partial subframe transmissions for standalone LTE-U, according to certain embodiments. The method may begin at step 1702 when network node 115 receives a first message on an UL PRACH where a first portion of the PRACH preamble guard is located at a beginning of a first subframe containing the preamble. The preamble may be used for a LBT procedure. In certain embodiments, the PRACH preamble may be constructed by repetition of a short sequence that is truncated due to LBT. In certain embodiments, the first message may be transmitted across non-contiguous frequency resources spanning a fraction of the UL system bandwidth. In certain embodiments, the duration of the guard period may range from one or more CCA slots. In a particular embodiment, the duration of the guard period may be of a duration equivalent to one or more inter-frame spaces. In certain embodiments, the PRACH may span an entire subframe. In other embodiments, the preamble may span a partial subframe and the preamble may be constructed based on repetitions of a short sequence of one SC-FDMA symbol. The sequence of repetition of a short sequence may be delayed due to LBT.

At step 1704, network node 115 identifies a start position of the subframe based on a PRACH preamble sequence that indicated the starting position. In certain embodiments, the start time of the subframe is a time instant measured by a UE in downlink which may be delayed compared to a start of the subframe in eNB.

In certain embodiments, the methods for using partial subframe transmissions for standalone LTE-U as described in FIG. 22 may be performed by one or more virtual computing devices. FIG. 23 illustrates an example virtual computing device 1800 for using partial subframe transmissions for standalone LTE-U, according to certain embodiments. In certain embodiments, virtual computing device 1800 may include modules for performing steps similar to those described above with regard to the method illustrated and described in FIG. 22. For example, virtual computing device 1800 may include at least one receiving module 1802, at least one identifying module 1804, and any other suitable modules for using partial subframe transmissions for standalone LTE-U. In some embodiments, one or more of the modules may be implemented using one or more processors 220 of FIG. 7. In certain embodiments, the functions of two or more of the various modules may be combined into a single module.

The receiving module 1802 may perform the receiving functions of virtual computing device 1800. For example, in a particular embodiment, receiving module 1802 may receive a first message on an UL PRACH where a first portion of the PRACH preamble guard is located at a beginning of a first subframe containing the preamble. The preamble may be used for a LBT procedure. In certain embodiments, the PRACH preamble may be constructed by repetition of a short sequence that is truncated due to LBT.

The identifying module 1804 may perform the identifying functions of virtual computing device 1800. For example, in a particular embodiment, identifying module 1804 may identify a start position of the subframe based on a PRACH preamble sequence that indicated the starting position. In certain embodiments, the start time of the subframe is a time instant measured by a UE in downlink which may be delayed compared to a start of the subframe in eNB.

Other embodiments of computer networking virtual apparatus 1800 may include additional components beyond those shown in FIG. 23 that may be responsible for providing certain aspects of the network node's 115 functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

Figure 24:
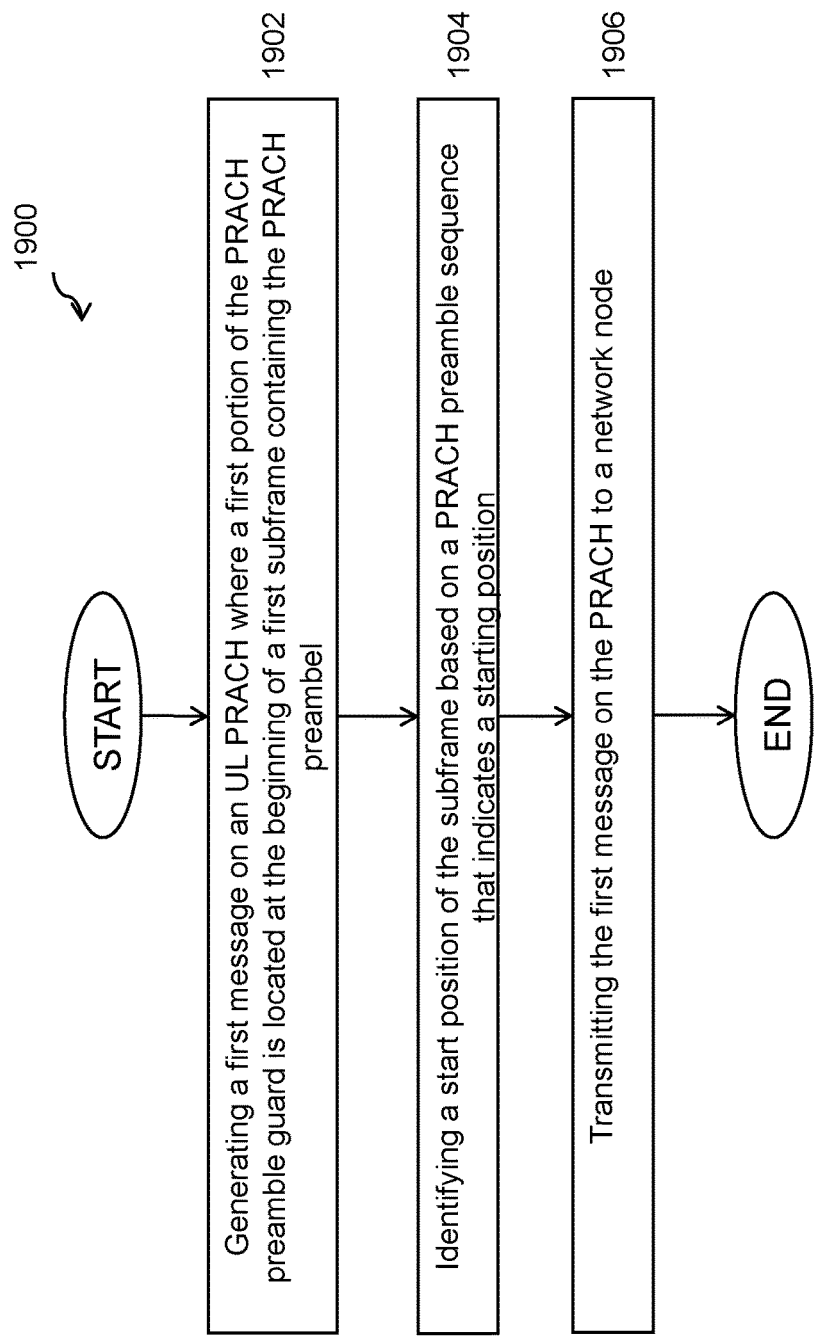
FIG. 24 illustrates an example alternative method by a wireless device using partial subframe transmissions for standalone LTE-U, according to certain embodiments.

FIG. 24 illustrates an example method 1900 by a wireless device 110 using partial subframe transmissions for standalone LTE-U, according to certain embodiments. The method may begin at step 1902 when wireless device 110 generates a first message on an UL PRACH where a first portion of the PRACH preamble guard is located at a beginning of a first subframe containing the preamble. The preamble may be used for a LBT procedure. In certain embodiments, the PRACH preamble is constructed by repetition of a short sequence that is truncated due to LBT. The repetition of a short sequence may be delayed due to LBT.

At step 1904, wireless device 110 identifies a start position of the subframe based on a PRACH preamble sequence that indicated the starting position. In certain embodiments, the duration of the guard period may range from one or more CCA slots. In certain embodiments, the duration of the guard period may be of a duration equivalent to one or more inter-frame spaces. In certain embodiments, the start time of the subframe is a time instant measured by a wireless device 110 in downlink which may be delayed compared to a start of the subframe at the network node 115.

At step 1906, wireless device 110 transmits the first message on the PRACH to a network node. In certain embodiments, the first message may be transmitted across non-contiguous frequency resources spanning a fraction of the UL system bandwidth. In certain embodiments, the PRACH may span an entire subframe. In other embodiments, the PRACH may span a partial subframe. In a particular embodiment, for example, the preamble may span a partial subframe and the preamble may be constructed based on repetitions of a short sequence of one SC-FDMA symbol.

Figure 25:
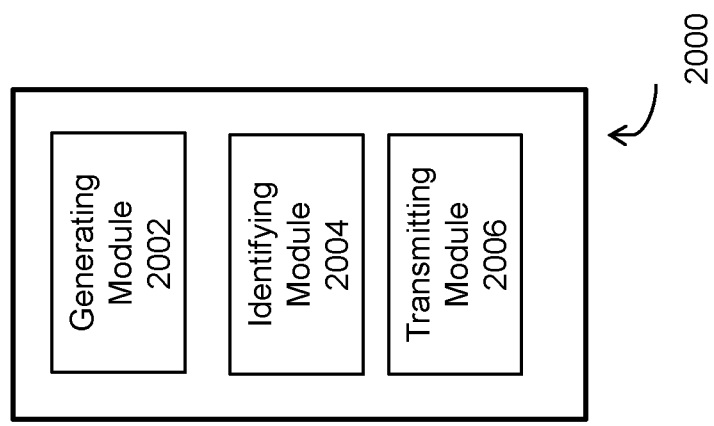
FIG. 25 illustrates an alternative example virtual computing apparatus using partial subframe transmissions for standalone LTE-U, according to certain embodiments.

In certain embodiments, the method of FIG. 24 for using partial subframe transmissions for standalone LTE-U as described above may be performed by one or more virtual computing devices. FIG. 25 illustrates an example virtual computing device 2000 using partial subframe transmissions for standalone LTE-U, according to certain embodiments. In certain embodiments, virtual computing device 2000 may include modules for performing steps similar to those described above with regard the method illustrated and described in FIG. 24. For example, virtual computing device 2000 may include at least one generating module 2002, at least one identifying module 2004, at least one transmitting module 2006, and any other suitable modules for receiving partial subframes transmissions for standalone LTE-U. In some embodiments, one or more of the modules may be implemented using one or more processors 720 of FIG. 12. In certain embodiments, the functions of two or more of the various modules may be combined into a single module. The generating module 2002 may perform the generating functions of virtual computing device 2000. For example, in a particular embodiment, generating module 2002 may generate a first message on an UL PRACH where a first portion of the PRACH preamble guard is located at a beginning of a first subframe containing the preamble. The preamble may be used for a LBT procedure. In certain embodiments, the PRACH preamble is constructed by repetition of a short sequence that is truncated due to LBT. The repetition of a short sequence may be delayed due to LBT.

The identifying module 2004 may perform the identifying functions of virtual computing device 2000. For example, in a particular embodiment, identifying module 2004 may identify a start position of the subframe based on a PRACH preamble sequence that indicated the starting position. In certain embodiments, the duration of the guard period may range from one or more CCA slots. In certain embodiments, the duration of the guard period may be of a duration equivalent to one or more inter-frame spaces. In certain embodiments, the start time of the subframe is a time instant measured by a wireless device 110 in downlink which may be delayed compared to a start of the subframe at the network node 115.

As another example, transmitting module 2006 may transmit the first message on the PRACH to a network node. In certain embodiments, the first message may be transmitted across non-contiguous frequency resources spanning a fraction of the UL system bandwidth. In certain embodiments, the PRACH may span an entire subframe. In other embodiments, the PRACH may span a partial subframe. In a particular embodiment, for example, the preamble may span a partial subframe and the preamble may be constructed based on repetitions of a short sequence of one SC-FDMA symbol.

Other embodiments of computer networking virtual apparatus 2000 may include additional components beyond those shown in FIG. 25 that may be responsible for providing certain aspects of the wireless device's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Some embodiments of the disclosure may provide one or more technical advantages. For example, in certain embodiments, the systems and methods may enhance the efficiency of LBT before preamble transmission. Another advantage may be that additional DL transmission opportunities for the eNB to complete the initial access procedure are provided. Still another advantage may be improved network performance of standalone LTE-U in densely loaded scenarios.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Other implementations may include a wireless communication device and/or access node configured to implement the described method, or a wireless communication system in which a wireless communication device and/or access node implement the described method.

Modifications, additions, or omissions may be made to the methods disclosed herein without departing from the scope of the invention. The methods may include more, fewer, or other steps. Additionally, steps may be performed in any suitable order.

The invention claimed is:

1. A method by a network node for transmitting random access (RA) response, the method comprising:
    forming, by the network node, a first signal for transmission to a wireless device, wherein forming the first signal comprises:
    placing a RA response message in a first partial subframe comprising a control data portion of a Physical Downlink Control Channel (PDCCH) message; and
    transmitting, by the network node, within the first partial subframe, the first signal to the wireless device, wherein prior to transmitting the first signal, transmitting a second signal to the wireless device, the second signal indicating that the subsequent first signal is transmitted in the first partial subframe.

2. The method of claim 1, further comprising:
    prior to forming the first signal receiving a second signal from the wireless device, the second signal comprising a RA request message on an uplink physical random access channel (TRACH) from the wireless device.

3. A network node for transmitting random access (RA) response, the network node comprising:
    a memory storing instructions; and
    a processor operable to execute the instructions to cause the processor to:
        form a first signal for transmission to a wireless device, wherein forming the first signal comprises
        placing a RA response message in a first partial subframe comprising a control data portion of a Physical Downlink Control Channel (PDCCH) message; and
        transmit the first signal within the first partial subframe, to the wireless device, wherein prior to transmitting the first signal, transmit a second signal to the wireless device the second signal indicating that the subsequent first signal is transmitted in the first partial subframe.

4. The network node of claim 3, wherein the processor is further operable to execute the instructions to cause the processor to:
    prior to forming the first signal receive a second signal from the wireless device, the second signal comprising a RA request message on an uplink physical random access channel (PRACH) from the wireless device.

5. A method by a wireless device for receiving a random access (RA) response from a network node, the method comprising:
    receiving, by the wireless device, a first signal indicating that a second signal to be subsequently received in a first partial subframe by the wireless device;
    receiving, by the wireless device, the second signal in the first partial subframe, wherein the second signal comprises a RA response message and wherein the first partial subframe comprises a control data portion of a Physical Downlink Control Channel (PDCCH) message; and
    identifying, by the wireless device, the RA response message within the first partial subframe based on the received first signal.

6. A wireless device for receiving a random access (RA) response from a network node, the wireless device comprising:
    a memory storing instructions; and
    a processor operable to execute the instructions to cause the processor to;
        receive a first signal indicating that a second signal to be subsequently received in a first partial subframe, by the wireless device;
        receive the second signal in the first partial subframe, wherein the second signal comprises a RA response message and wherein the first partial subframe comprises a control data portion of a Physical Downlink Control Channel (PDCCH) message; and
        identify the RA response message within the first partial subframe based on the received first signal.

* * * * *